United States Patent [19]

Bauman

[11] 4,175,724
[45] Nov. 27, 1979

[54] SPRING CLIP BREAK-AWAY

[75] Inventor: Robert S. Bauman, St. Charles, Mo.

[73] Assignee: St. Louis Diecasting Corporation, Bridgeton, Mo.

[21] Appl. No.: 820,813

[22] Filed: Aug. 1, 1977

[51] Int. Cl.² .................... B63H 21/26; F16M 1/02
[52] U.S. Cl. ...................................... 248/642; 115/17
[58] Field of Search ................ 248/4, 284, 291, 292, 248/293; 115/17, 18 R

[56] References Cited

U.S. PATENT DOCUMENTS

| | | | |
|---|---|---|---|
| 2,370,232 | 2/1945 | Creekbaum | 24/201 TR X |
| 3,131,674 | 5/1964 | Dalton | 24/201 TR X |
| 3,268,996 | 8/1966 | Luketa | 248/23 X |
| 3,698,672 | 10/1972 | Gilbert | 115/17 X |
| 3,915,417 | 10/1975 | Norton | 248/4 |

Primary Examiner—J. Franklin Foss

Attorney, Agent, or Firm—Rogers, Eilers & Howell

[57] ABSTRACT

A spring clip break-away is used as the upper swivel point on a collar which secures a trolling motor to a retractor mounted on the bow of a fishing boat. The spring clip break-away has at least one spring clip secured to an upper support arm of the retractor with an arcuate section defining a recess for receiving a pin which is rotatably secured to the motor collar. During normal retractor use, the pin is held by the spring clips within the recess. When an unusually large torque is applied to the motor shaft, for example by the motor shaft hitting a submerged log, the motor rotates about a lower swivel point and pulls the pin out of the jaws of the spring clips, thereby allowing the motor and shaft to rotate under the bow and avoid damage to the retractor and the motor. After the log is removed, the pin may be quickly and easily re-positioned in the spring clips to permit immediate use of the retractor and motor.

17 Claims, 7 Drawing Figures

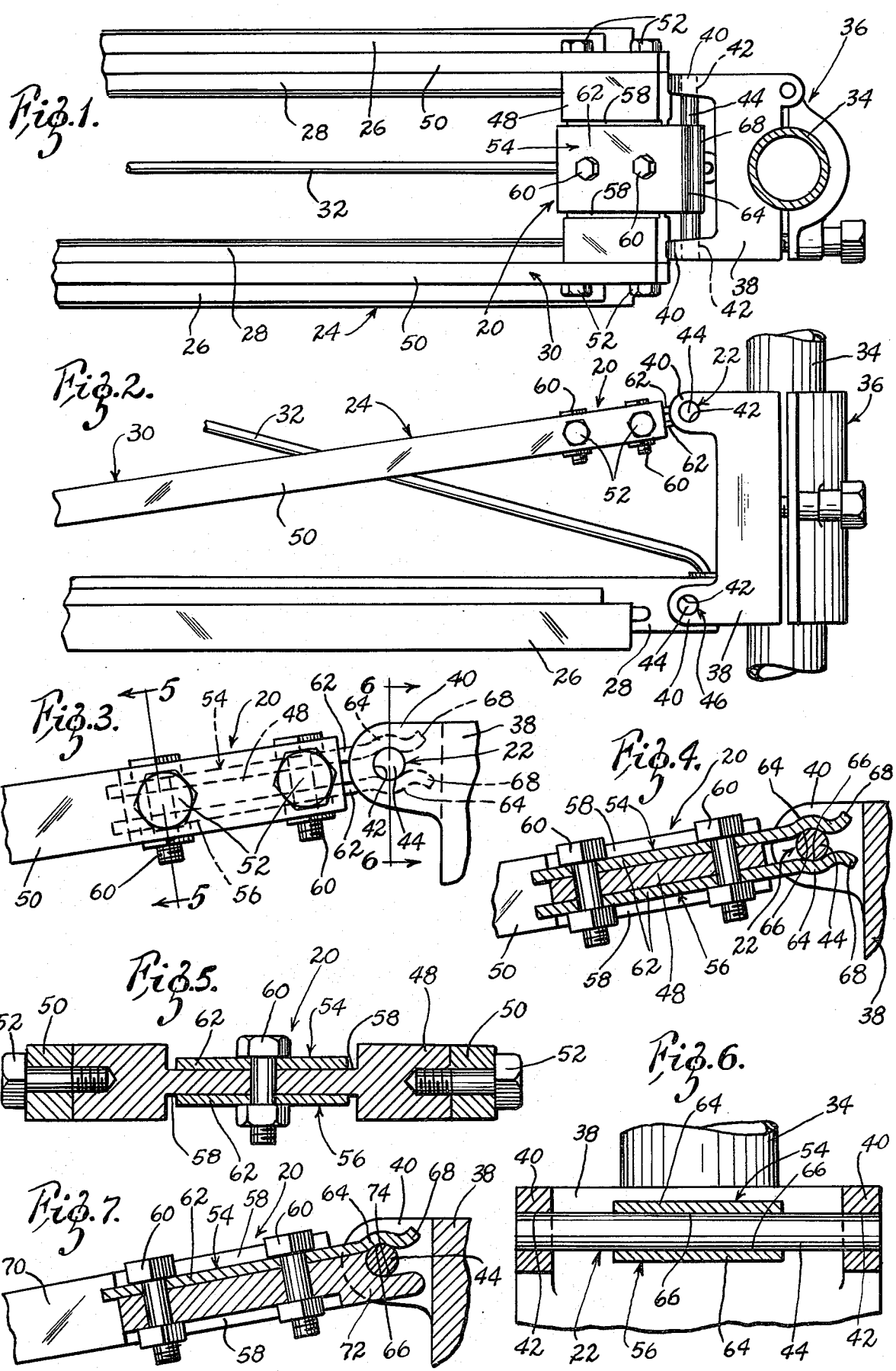

SPRING CLIP BREAK-AWAY

BACKGROUND AND SUMMARY

Trolling motors are used on small fishing boats to slowly and quietly power the boat through the water while fishermen fish from the side of the boat. These trolling motors are generally mounted to the bow of the boat and include a mounting bracket or other arrangement so that the motor may be retracted from the water when not in use. The better and more convenient bracket designs remain fully attached to the motor and retract the motor completely from the water and on to the front deck or bow of the boat. A typical retractor is disclosed in U.S. Pat. No. 3,861,628 and assigned to St. Louis Die Casting Corp., the assignee of this patent application, and which patent in its entirety is hereby incorporated herein by reference.

The trolling motor is generally secured to the retractor by means of a bracket which fastens around the motor shaft and has two swivel mounting points to allow the motor to swivel about the retracting arm members as the retractor is operated. These swivel points can be damaged during the operation of the trolling motor when the motor or its shaft runs into submerged logs or other obstructions in the water. When the motor or shaft comes in contact with an obstruction, a torque is created which attempts to turn the motor and shaft inwardly under the front bow about one of the bracket swivel points. Generally, it is the lower swivel point which acts as the fulcrum and the upper swivel point is severely damaged or broken away from the bracket when this occurs.

There have been various attempts at modifying the retractor to eliminate damage to the upper swivel point. One of these is to provide a shear pin for the upper swivel point which has enough rigidity to withstand rough handling, but will shear if a sudden impact force is applied to the lower end of the motor shaft. However, this solution has several drawbacks which make it unacceptable for general use. It is common for the retractor device to be roughly treated and banged around during operation which may cause the pin to deform and restrict the swivel action at the upper swivel point. To compound the problem, once the pin becomes deformed it cannot be easily replaced as it is usually installed longitudinally through a collar member and a deformation of the pin wedges it tightly in place. Once deformed, the pin cannot be driven through and out the other side to replace it. Conversely, the shear pin may become loose and wobble within its mounting so as to incorrectly position the motor in the retractor and prevent the motor from being retracted onto the bow.

When a pin shears, it must be replaced with a new pin before the trolling motor can be put back into operation. This requires that the fishermen discontinue their fishing, hunt for a new shear pin, and have on hand the necessary tools to install the new pin. Not only is this time consuming, but it is very likely that the proper tools are not available on a fishing boat or that the fisherman has forgotten to bring along a spare pin.

Applicant has developed a design with a spring clip break-away and pin assembly which provides all the advantages of the shear pin but eliminates the drawbacks. The spring clip break-away generally includes one or two flat, yieldable, resilient members which have arcuate sections at their end for receiving a pin. The pin is fixedly secured to a collar which mounts the motor and motor shaft. During normal operation, the pin is held in place between the spring members or between a spring member and a support arm, thus securing the motor to the support arm. When a sudden impact or torque is applied to the shaft of the motor, the pin pulls out from between the jaws of the spring members or from underneath the single spring member, thereby allowing the motor and shaft to rotate about the lower swivel point of the mount. This allows the motor and shaft to be pushed out of the way by the obstruction or log without damaging the motor mount or retractor and with a minimum of damage to the motor itself. After the obstruction is cleared, the motor shaft and mount can be repositioned for use by merely providing a torque against the upper end of the motor which repositions the pin within the jaws of the spring members. There is usually provided means to loosen the spring members so that the pin may be repositioned with less torque than is required to pull it loose.

Applicant's design provides a unique swivel point connection which freely rotates during normal use and yet will "break away" when an unusually large torque is applied to the motor shaft. The spring clip break-away is inexpensive and easily installed on both existing retractors and new retractors. Applicant's device can be more fully understood by referring to the drawings and description of the preferred embodiment.

BRIEF DESCRIPTION OF THE DRAWINGS

FIG. 1 is a plan view of a retractor with the spring clip break-away in operating position;

FIG. 2 is a side view of a retractor with the spring clip break-away in operating position;

FIG. 3 is an enlarged detail view of the spring clip break-away;

FIG. 4 is an enlarged cross-sectional view of the spring clip break-away;

FIG. 5 is a cross-sectional view detailing the mounting of the spring clip to the connecting link taken along line 5—5 in FIG. 3;

FIG. 6 is a cross-sectional view detailing the swivel pin and spring clip jaws taken along line 6—6 in FIG. 3;

FIG. 7 is an enlarged detail view of a retractor having an integral lower support arm and one spring clip in the spring clip break-away.

DESCRIPTION OF THE PREFERRED EMBODIMENT

The spring clip break-away 20 is used as the upper swivel point 22 of a typical trolling motor retractor 24 as is shown in FIG. 2 in a position with the trolling motor in the water. The retractor 24 has a base 26, a lower support arm 28, an upper support arm assembly 30, and a raising mechanism 32. The trolling motor shaft 34 is secured to the retractor 24 by a collar assembly 36 which has an inner bracket 38 with upper and lower ears 40 having holes 42 for supporting swivel pins 44. These swivel pins 44 provide the upper swivel point 22 and lower swivel point 46 about which the upper and lower support arms 30, 28 swivel when the retractor 24 is operated. Swivel pins 44 may be rotatably mounted between ears 40 to enhance the swivel action in the connection.

As shown in FIG. 1, the upper support arm assembly 30 has a connecting link 48 which extends between the two upper support arms 50 and is fastened thereto by bolts 52. An upper yieldable spring clip 54 and a lower yieldable spring clip 56 fit into recesses 58 in the connecting link 48 and are bolted thereto by bolts 60. Spring clips 54, 56 may be constructed of any material which provides a yieldable, resilient member capable of withstanding repeated use such as a steel or steel alloy.

Each spring clip 54, 56 has a flat base 62 which is shaped to fit within the recess 58 and also provides a broad area to securely attach the spring clip 54, 56 to the connecting link 48. At the end of the spring clip 54, 56 closest the motor shaft 34, an arcuate section 64 defines a recess 66. These recesses 66 may define a substantially cylindrical space for receiving the upper swivel pin 44 and retaining the upper support arm assembly 30 in place about the upper swivel point 22. The outermost tip 68 of each clip 54, 56 may be turned away from the center of the cylindrical space so as to aid in inserting the swivel pin 44. Shims (not shown) having a bolt hole pattern to match the spring clip 54, 56 may be mounted between the link 48 and spring clips 54, 56 to increase the width of the space between the recesses 66. This adjustment will permit a fine tuning of the torque required to pull the swivel pin 44 out of the jaws of the spring clips 54, 56.

In another embodiment, as shown in FIG. 7, an upper support arm 70 is provided in the retractor 24 instead of the upper support arm assembly 30. The upper support arm 70 has an integral lower jaw 72 which replaces the lower spring clip 56. The lower jaw 72 may have a curved section 74 which substantially defines the cylindrical space in combination with the recess 66 of the upper spring clip 54. In this embodiment, the upper spring clip 54 provides the spring tension which holds the swivel pin 44 in place within the cylindrical space.

Operation for both embodiments is essentially the same. The swivel pin 44 may be inserted into the cylindrical space by either of two methods. The first of these would be to merely force the swivel pin 44 against the outer tips of the spring clips 54, 56 to deflect them apart and allow the swivel pin 44 to slip into the cylindrical space. In the second embodiment, only the upper spring clip 54 would deflect as the lower jaw 72 is an extension of the upper support arm 70. The second method would be to loosen bolts 60 to open the spring clips 54, 56 and then insert the swivel pin 44 before tightening bolt 60 to retain the swivel pin 44 in place within the cylindrical space. In the second embodiment, only the upper spring clip 54 would be loosened. Shims (not shown) are provided to adjust the tension of the spring clips 54, 56 against the pin 44 within the cylindrical space. Greater tension would be achieved with fewer shims such that the spring clips 54, 56 would remain partially deflected by the pin 44. In this condition, greater torque would be required to remove the pin 44 from the jaws of the spring clips 54, 56.

During trolling motor operation, the motor shaft 34 would be extended substantially vertically over the bow of the boat and the retractor 24 would be positioned as shown in FIG. 2. When the trolling motor shaft 34 would hit an obstruction such as a partially submerged log, it would develop a torque about the lower swivel point 46 which would tend to pull the upper part of the collar assembly 36 away from the upper support arm assembly 30. This torque would cause the swivel pin 44 to be pulled forward against the forward end of the recesses. The recesses 66 would deflect open in a sudden motion allowing the swivel pin 44 to escape. Thus, the motor shaft 34 would rotate about the lower swivel point 46 and damage to the motor shaft and retractor as a result of the collision with the obstruction would be minimized. After the obstruction is cleared from the motor shaft 34, the upper swivel pin 44 is quickly and easily replaced in position for continued use of the retractor and trolling motor.

Various modifications and changes may be made by one of ordinary skill in the art within this invention as disclosed by applicant. Such changes and modifications are within the scope and teaching of this invention and applicant intends that his invention be limited only by the claims appended hereto.

What is claimed is:

1. A boat motor retracting device having a plurality of support arms, said support arms extending between the boat and the boat motor, at least one yieldable attachment means securing the boat motor to a support arm, said yieldable attachment means including a spring means and a pin means, said spring means comprising two opposing members, each member having an arcuate section defining a recess, said recesses cooperating to yieldably retain the pin means, and means to maintain said spring means aligned with said pin means as said yieldable attachment operates to thereby minimize the force applied to said spring means.

2. The device of claim 1 further comprising means to adjust the orientation of the first recess with respect to the second and thereby vary the force required to insert or remove the pin means therefrom.

3. A boat motor retracting device having at least two support arms, said support arms extending between the boat and the boat motor, a swivel means securing a lower support arm to the boat motor, a yieldable attachment means securing an upper support arm to the boat motor, said upper support arm being pivotally connected to the boat; said yieldable attachment means comprising a spring means having two opposing members secured to the outboard end of the support arm, each member having an arcuate section defining a recess, said recesses being oriented in a spaced apart relationship, a pin means secured to the inboard side of the boat motor and positioned so that the recesses receive and yieldably retain the pin means therebetween as the boat motor is pivoted about the swivel point, the spring means cooperating with the support arm pivot to maintain said pin means aligned with the recesses as the pin means moves into or out of said recesses, thereby distributing the force equally between the opposing members.

4. A spring mount for use in combination with a boat motor and a boat motor retracting device having a support arm positioned above a swivel point, the support arm being pivotally connected to the boat, the motor being pivotally secured to the retracting device at the swivel point, said spring mount comprising: pin means secured to the motor, spring means secured to the support arm, said spring means having an arcuate section defining a recess in the end of said spring means closest the motor, said recess facing the support arm to define a recess for receiving and yieldably retaining the pin means, said pin means cooperating with said support arm to maintain the pin means aligned with the recess as the pin means is moved into and out of said recess.

5. The device of claim 4 wherein the arcuate section remains partially deflected when the pin is within the recess space thereby exerting a squeezing force to retain said pin within said recess and the motor in an upright position about the swivel point.

6. The device of claim 4 wherein the support arm defines a second recess which opposes said first recess in a spaced apart relationship for receiving the pin means.

7. The device of claim 4 further comprising means to adjust the size of the recess and thereby vary the force required to insert or remove the pin means therefrom.

8. The device of claim 7 wherein the adjustment means includes means to vary the position of the spring means relative to the support arm.

9. The device of claim 4 wherein the outboard end of said arcuate section is turned away from said support arm to aid in inserting the pin means into the recess.

10. A boat motor retracting device having a plurality of support arms extending between the boat and the boat motor, a swivel means securing a lower support arm to the boat motor, pin means removably secured by its ends to the motor, a first resilient spring means removably secured to the top of an upper support arm, a second resilient spring means removably secured to the bottom of the upper support arm, each spring means having an arcuate section defining a recess, said recesses extending beyond the end of the support arm and aligned to form a space between them for receiving and yieldably retaining the pin means, said pin means deflecting said recesses outwardly as it is moved into and out of said space including means to maintain said pin means aligned with said recesses as said pin means moves into or out of engagement with said spring means.

11. The device of claim 10 wherein a recess remains partially deflected when the pin is within the space thereby exerting a squeezing force to retain said pin within said space and the boat motor in an upright position about the swivel point.

12. The device of claim 10 further comprising means to adjust the size of the space and thereby vary the force required to insert or remove the pin means therefrom.

13. The device of claim 10 wherein the adjustment means includes means to vary the position of each spring means relative to the support arm.

14. The device of claim 10 wherein the outer end of each of said arcuate sections is turned away from each other to aid in inserting the pin means into the space.

15. A yieldable attachment device for use in combination with a boat motor retracting device having a plurality of support arms, said yieldable attachment device including a spring means and a pin means, said spring means including at least two members for mounting in a spaced apart relationship, said pin means being releasably retained by said spring means, and means to maintain said spring means aligned with said pin means as said yieldable attachment operates to thereby minimize the force applied to said spring means by said pin means.

16. A boat motor retracting device having two support arms, said support arms extending between the boat and the boat motor, a yieldable attachment means securing the boat motor to an upper support arm, said yieldable attachment means including a spring means and a pin means, said spring means comprising two opposing members, each member having an arcuate section defining a recess, said recesses cooperating to yieldably retain the pin means, means to maintain said spring means aligned with said pin means as said yieldable attachment operates to thereby minimize the force applied to said spring means, a swivel means securing the boat motor to a lower support arm, both said yieldable attachment means and said swivel means being positioned substantially adjacent to the boat motor to provide a minimum radius of rotation as the yieldable attachment means releases to allow rotation of the boat motor about the swivel means.

17. The device of claim 16 further comprising means to adjust the orientation of the first recess with respect to the second and thereby vary the force required to insert or remove the pin means therefrom.

* * * * *